US012804512B2

(12) United States Patent
Yamaguchi et al.

(10) Patent No.: US 12,804,512 B2
(45) Date of Patent: Nov. 17, 2026

(54) COMMUNICATION APPARATUS, INFORMATION PROCESSING SYSTEM, AND INFORMATION PROCESSING METHOD

(71) Applicant: MINEBEA MITSUMI Inc., Kitasaku-gun (JP)

(72) Inventors: Naoki Yamaguchi, Kitasaku-gun (JP); Yoshihiro Nakamura, Kitasaku-gun (JP); Yosuke Oda, Kitasaku-gun (JP); Takuya Kitajima, Kitasaku-gun (JP); Tomoyuki Okada, Tama (JP)

(73) Assignee: MINEBEA MITSUMI INC., Nagano (JP)

( * ) Notice: Subject to any disclaimer, the term of this patent is extended or adjusted under 35 U.S.C. 154(b) by 354 days.

(21) Appl. No.: 18/668,603

(22) Filed: May 20, 2024

(65) Prior Publication Data

US 2024/0406838 A1 Dec. 5, 2024

(30) Foreign Application Priority Data

May 29, 2023 (JP) ................................. 2023-087531

(51) Int. Cl.
*H04W 40/24* (2009.01)

(52) U.S. Cl.
CPC ....... *H04W 40/244* (2013.01); *H04W 40/248* (2013.01)

(58) Field of Classification Search
CPC ... H04W 40/244; H04W 40/248; H04W 4/80; H04W 4/02; H04W 4/20; H04W 76/11
See application file for complete search history.

(56) References Cited

U.S. PATENT DOCUMENTS 9,549,325 B2 * 1/2017 Huh ........................ H04W 4/80
2016/0315723 A1 10/2016 Koriyama et al.
2017/0245101 A1 * 8/2017 Chandrasekaran ..... H04L 67/52

FOREIGN PATENT DOCUMENTS

JP 2016-208409 A 12/2016

* cited by examiner

*Primary Examiner* — Marisol Figueroa
(74) *Attorney, Agent, or Firm* — Chrisman Gallo Tochtrop LLC

(57) ABSTRACT

A communication apparatus receives status information including a value of a status regarding reception or non-reception of a beacon signal. The status is associated with each of pieces of identification information 25_1 to **25_*n***. When receiving the status information after transmitting a beacon signal, the communication apparatus selects, based on the status information, another identification information different from identification information of the beacon signal transmitted most recently and transmits a beacon signal including the selected identification information, instead of the beacon signal transmitted most recently.

12 Claims, 6 Drawing Sheets

35

| TYPE OF BEACON SIGNAL (IDENTIFICATION INFORMATION) | STATUS |
|---|---|
| IDENTIFICATION INFORMATION 25_1 (ID_A) | RECEPTION (ENTRY) |
| IDENTIFICATION INFORMATION 25_2 (ID_B) | RECEPTION (ENTRY) |
| IDENTIFICATION INFORMATION 25_3 (ID_C) | NON-RECEPTION (EXIT) |
| ⋮ | |
| IDENTIFICATION INFORMATION 25_n (ID_x) | NON-RECEPTION (EXIT) |

FIG. 2

COMMUNICATION APPARATUS, INFORMATION PROCESSING SYSTEM, AND INFORMATION PROCESSING METHOD

CROSS-REFERENCE TO RELATED APPLICATIONS

This application claims the benefit of priority to Japanese Patent Application Number 2023-087531 filed on May 29, 2023. The entire contents of the above-identified application are hereby incorporated by reference.

TECHNICAL FIELD

The present invention relates to a communication apparatus, an information processing system, and an information processing method, and relates to, for example, a communication apparatus, an information processing system, and an information processing method using communication by a beacon.

BACKGROUND ART

In recent years, more and more services use beacon apparatuses periodically transmitting a signal (hereinafter, also referred to as a "beacon signal") including identification information such as a UUID, Major, and Minor through short-range wireless communication such as Bluetooth (trade name).

For example, a service is known. In the service, a beacon apparatus is disposed at a predetermined indoor or outdoor place, and when a user carrying a mobile terminal enters an area reached by a beacon signal emitted from the beacon apparatus (hereinafter also referred to as a "beacon area"), the mobile terminal communicates with a server with reception of the beacon signal as a trigger. Thus, the mobile terminal receives information related to the area from the server and presents the information to the user (for example, see Patent Document 1).

In general, in a service using a beacon apparatus, an information processing apparatus serving as a mobile terminal receiving a beacon signal manages a status regarding reception or non-reception (detection or non-detection) of the beacon signal (hereinafter, also simply referred to as "status") and executes various types of processing (data processing and the like) with switching of the status as a trigger. Here, the status regarding reception or non-reception of the beacon signal can be said to represent the status of entry or exit of the mobile terminal into or from the beacon area. The status is set to any one of "reception (entry)" and "non-reception (exit)".

For example, when the beacon signal is received, the information processing apparatus sets the status to "reception (entry)". On the other hand, when the beacon signal is no longer received, the information processing apparatus sets the status to "non-reception (exit)".

In this way, the information processing apparatus executes various types of processing with, as a trigger, switching of the status regarding reception or non-reception of the beacon signal, thereby achieving the above-described service.

CITATION LIST

Patent Literature

Patent Document 1: JP 2016-208409 A

SUMMARY OF INVENTION

Technical Problem

Prior to the present application, the present inventors have studied development of a system. In the system, a beacon apparatus repeatedly prompts an information processing apparatus to execute processing (generate an event) by using a beacon signal. The study has revealed the following problems.

When the information processing apparatus receives the beacon signal and then the information processing apparatus remains within the beacon area of the beacon signal, the reception (entry) state is maintained and the status is not switched.

Moreover, switching of the status managed by the information processing apparatus from non-reception (exit) to reception (entry) is immediately performed upon detection of the beacon signal by the information processing apparatus, while switching of the status from reception (entry) to non-reception (exit) is performed according to a determination result indicating non-reception of the beacon signal for a certain period of time. Thus, even if the information processing apparatus is moved to the outside of the beacon area, a certain period of time is required until the status is switched. In addition, in order to detect non-reception of the beacon signal for a certain period of time, the information processing apparatus measures a time of not receiving the beacon signal, but when the beacon signal is detected even once during the time measurement, the measured time is reset. Thus, the time lag until the status is switched from reception (entry) to non-reception (exit) may further increase.

In this way, in the method using the conventional beacon apparatus, when the information processing apparatus receives the beacon signal even once, the status is not switched unless the information processing apparatus exits the beacon area for a certain period of time or more. Thus, it is not easy to repeatedly prompt the information processing apparatus to execute processing (generate an event) by using the beacon signal.

The present invention is to solve the above-described problem, and an object is to provide a system capable of repeatedly prompting an information processing apparatus to execute processing by using a beacon signal.

Solution to Problem

A communication apparatus according to a typical embodiment of the present invention includes a first communication unit configured to transmit a beacon signal including identification information, a second communication unit configured to communicate with an external information processing apparatus, a first storage unit configured to store a plurality of pieces of the identification information different from each other, and a first control unit configured to select one piece of identification information from among the plurality of pieces of identification information and instruct the first communication unit to transmit the beacon signal including the selected piece of identification information, wherein the second communication unit receives status information including a value of a status regarding reception or non-reception of the beacon signal, the status is associated with each of the pieces of identification information, and when the second communication unit receives the status information after the first communication unit transmits the beacon signal, the first control unit selects, based on the status information, other identification information different from the identification information of the beacon signal transmitted most recently and instructs the first communication unit to transmit the beacon signal including the selected identification information, instead of the beacon signal transmitted most recently.

Advantageous Effects of Invention

According to an aspect of the present invention, it is possible to achieve a system capable of repeatedly prompting an information processing apparatus to execute processing by using a beacon signal.

BRIEF DESCRIPTION OF DRAWINGS

FIG. 2 is a diagram illustrating an example of status information.

DESCRIPTION OF EMBODIMENTS

1. Overview of Embodiments

Figure 1:
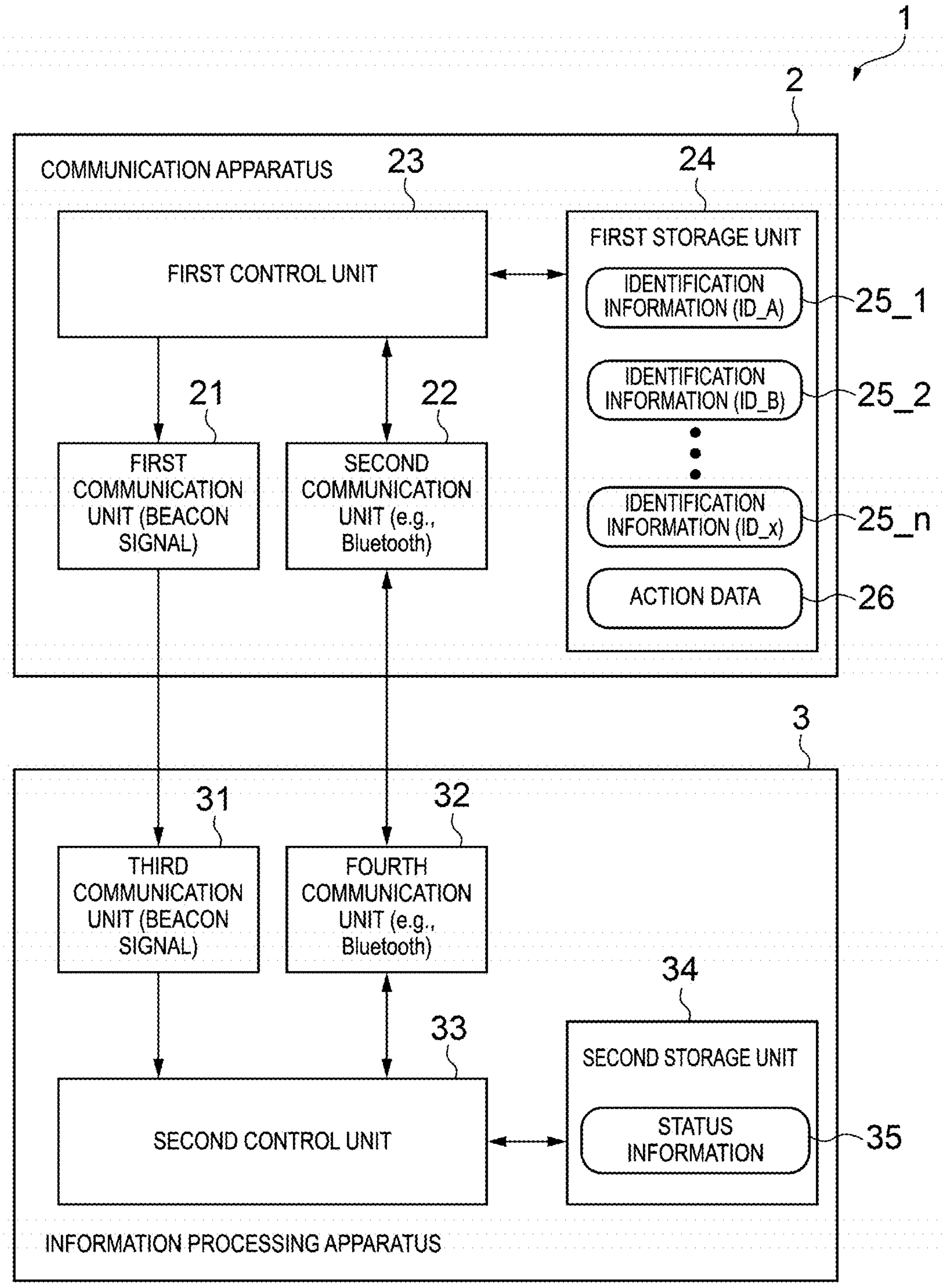
FIG. 1 is a diagram illustrating a configuration of an information processing system including a communication apparatus according to an embodiment.

First, an overview of typical embodiments of the invention disclosed in the present application will be described. Note that, in the following description, by way of example, reference numerals on the drawings corresponding to the components of the invention are indicated in parentheses.

[1] A communication apparatus (2) according to a typical embodiment of the present invention includes a first communication unit (21) configured to transmit a beacon signal including identification information (25), a second communication unit (22) configured to communicate with an external information processing apparatus (3), a first storage unit (24) configured to store a plurality of pieces of the identification information (25_1 to 25_*n*) different from each other, and a first control unit (23) configured to select one piece of identification information (25) from among the plurality of pieces of identification information and instruct the first communication unit to transmit the beacon signal including the selected piece of identification information, wherein the second communication unit receives status information (35) including a value of a status regarding reception or non-reception of the beacon signal, the status is associated with each of the pieces of identification information, and when the second communication unit receives the status information after the first communication unit transmits the beacon signal, the first control unit selects, based on the status information, another identification information different from the identification information of the beacon signal transmitted most recently and instructs the first communication unit to transmit the beacon signal including the selected identification information, instead of the beacon signal transmitted most recently.

[2] In the communication apparatus according to [1] described above, a first value (reception (entry)) or a second value (non-reception (exit)) different from the first value may be set as the value of the status, and when the status corresponding to the identification information (25) included in the beacon signal transmitted most recently is set to the first value and the status corresponding to the other identification information is set to the second value in the received status information, the first control unit may instruct the first communication unit to transmit the beacon signal including the other identification information having the status set to the second value, instead of the beacon signal transmitted most recently.

[3] In the communication apparatus according to [2] described above, when the status corresponding to the identification information of the beacon signal transmitted most recently is set to the first value and the status corresponding to the other identification information is set to the first value in the received status information, the first control unit may select the identification information of the beacon signal having a longest elapsed time from transmission stop and instruct the first communication unit to transmit the beacon signal including the selected identification information, instead of the beacon signal transmitted most recently.

[4] In the communication apparatus according to [2] described above, when the received status information includes new identification information not stored in the first storage unit and the value of the status corresponding to the new identification information, the first control unit may store the new identification information in the first storage unit.

[5] In the communication apparatus according to [1] to [4] described above, when the first communication unit transmits the beacon signal and then the second communication unit receives a response indicating reception of the beacon signal by the information processing apparatus, the first control unit may instruct the second communication unit to transmit data (26) to the information processing apparatus.

[6] An information processing system (1) according to a typical embodiment of the present invention includes a communication apparatus (2) and an information processing apparatus (3), wherein the communication apparatus includes a first communication unit (21) configured to transmit a beacon signal including identification information (25), a second communication unit (22) configured to communicate with the information processing apparatus, a first storage unit (24) configured to store a plurality of pieces of the identification information (25_1 to 25_*n*) different from each other, and a first control unit (23) configured to select one piece of identification information (25) from among the plurality of pieces of identification information and instruct the first communication unit to transmit the beacon signal including the selected piece of identification information, the information processing apparatus includes a third communication unit (31) configured to receive the beacon signal, a fourth communication unit (32) configured to communicate with the communication apparatus, a second storage unit (34) configured to store, for each of the pieces of identification information, status information (35) including a value of a status regarding reception or non-reception of the beacon signal of each of the pieces of identification information, and a second control unit (33) configured to update the status information upon reception of the beacon signal and instruct the fourth communication unit to transmit the status information, the status is associated with each of the pieces of identification information, in the communication apparatus, the first communication unit transmits the beacon signal, in the information processing apparatus, when the third communication unit receives the beacon signal, the second control unit updates, in the status information stored in the second storage unit, the value of the status corresponding to the identification information of the beacon signal received by the third communication unit and instructs the fourth communication unit to transmit the updated status information to the communication apparatus, and in the communication apparatus, when the second communication unit receives the status information after the first communication unit transmits the beacon signal, the first control unit selects, based on the status information, another identification information different from the identification information included in the beacon signal transmitted most recently and instructs the first communication unit to transmit the beacon signal including the selected identification information, instead of the beacon signal transmitted most recently.

[7] In the information processing system according to [6] described above, in the information processing apparatus, when the third communication unit receives the beacon signal, the second control unit may set the status corresponding to the identification information of the received beacon signal to a first value (reception (entry)), and when the third communication unit does not receive the beacon signal, the second control unit may set the status corresponding to the identification information of the unreceived beacon signal to a second value (non-reception (exit)), and, in the communication apparatus, the first control unit may select, from among the plurality of pieces of identification information, the identification information having the status set to the second value in the received status information and instruct the first communication unit to transmit the beacon signal including the selected identification information, instead of the beacon signal transmitted most recently.

[8] In the information processing system according to [7] described above, when the status corresponding to the identification information of the beacon signal transmitted most recently is set to the first value and the status corresponding to the other identification information is set to the first value in the received status information, the first control unit may select the identification information of the beacon signal having a longest elapsed time from transmission stop and instruct the first communication unit to transmit the beacon signal including the selected identification information, instead of the beacon signal transmitted most recently.

[9] In the information processing system according to [7] described above, in the information processing apparatus, if all the statuses included in the status information are set to the first value when the status information is transmitted, the second control unit may generate new identification information, set the status corresponding to the new identification information to the second value, generate new status information by adding the new identification information and the value of the status corresponding to the new identification information, and instruct the fourth communication unit to transmit the new status information, and, in the communication apparatus, when the status information received by the second communication unit includes the new identification information not stored in the first storage unit and the value of the status corresponding to the new identification information, the first control unit may store the new identification information in the first storage unit.

[10] In the information processing system according to any of [6] to [9] described above, in the information processing apparatus, when the third communication unit receives the beacon signal, the second control unit may transmit, to the communication apparatus, a response indicating reception of the beacon signal, and in the communication apparatus, when the second communication unit receives the response, the first control unit may instruct the second communication unit to transmit data (26) to the information processing apparatus.

[11] A method according to a typical embodiment of the present invention is an information processing method by an information processing system (1) including a communication apparatus (2) configured to store a plurality of pieces of identification information (25_1 to **25_*n*) different from each other and transmit a beacon signal including one piece of identification information (25) selected from among the plurality of pieces of identification information, and an information processing apparatus (3) configured to store status information (35**) including a value of a status regarding reception or non-reception of the beacon signal. In this method, the status is associated with each of the pieces of identification information. This method includes a first step (S1) of transmitting, by the communication apparatus, the beacon signal, a second step (S2) of receiving, by the information processing apparatus, the beacon signal, a third step (S3) of updating, by the information processing apparatus, the value of the status corresponding to the identification information of the beacon signal received in the second step, the value being included in the status information, a fourth step (S4, S66) of transmitting, by the information processing apparatus, the status information updated in the third step to the communication apparatus; and a fifth step (S7, S48) of, when the status information is received, selecting, by the communication apparatus, another identification information different from the identification information included in the beacon signal transmitted most recently based on the status information and transmitting, by the communication apparatus, the beacon signal including the selected identification information, instead of the beacon signal transmitted most recently.

[12] In the information processing method according to described above, the third step may include a sixth step (S61 to S64) of setting, by the information processing apparatus, the status corresponding to the identification information of the received beacon signal to a first value (reception (entry)) when the beacon signal is received, and a seventh step (S13) of setting, by the information processing apparatus, the status corresponding to the identification information of the unreceived beacon signal to a second value when the beacon signal is not received, and the fifth step may include an eighth step (S48) of selecting, by the communication apparatus, the identification information having the status set to the second value in the received status information from among the plurality of pieces of identification information, and a ninth step (S7) of transmitting, by the communication apparatus, the beacon signal including the identification information selected in the eighth step, instead of the beacon signal transmitted most recently.

2. Specific Examples of Embodiments

Hereinafter, specific examples of the embodiments of the present invention will be described with reference to the drawings.

Embodiments

FIG. 1 is a diagram illustrating a configuration of an information processing system including a communication apparatus according to an embodiment.

An information processing system 1 illustrated in FIG. 1 includes a communication apparatus 2 and an information processing apparatus 3. The information processing system 1 is a system enabling data transmission and reception and the like between the information processing apparatus 3 and the communication apparatus 2 by the information processing apparatus 3 executing various types of processing with, as a trigger, switching of a status regarding reception or non-reception of a beacon signal transmitted from the communication apparatus 2.

The communication apparatus 2 is an apparatus capable of emitting (transmitting) a beacon signal. The communication apparatus 2 has at least a function of transmitting and receiving data by communicating with an external apparatus and a function of performing program processing, in addition to a function of emitting a beacon signal.

The communication apparatus 2 is, for example, a program processing apparatus configured such that a processor such as a CPU, various storage devices such as a RAM, a ROM, and a flash memory, and peripheral circuits such as a counter (timer), a communication circuit, an A/D conversion circuit, a D/A conversion circuit, a clock generation circuit, and an input/output interface circuit are connected to each other via a bus or a dedicated line, the program processing apparatus being capable of wireless communication with an external apparatus.

The communication apparatus 2 transmits a beacon signal based on a predetermined communication standard. For example, the communication apparatus 2 transmits a beacon signal in conformity to the Bluetooth (trade name) Low Energy (BLE) standard. Note that the communication apparatus 2 may transmit a beacon signal in conformity to another communication standard such as the Wi-Fi (trade name) standard, and the communication standard of the beacon signal is not particularly limited.

The communication apparatus 2 stores a plurality of pieces of identification information 25_1 to **25_*n* (n is an integer of two or more) different from each other and transmits a beacon signal including one piece of identification information selected from among the plurality of pieces of identification information 25_1 to 25_*n*. Note that the pieces of identification information 25_1 to 25_*n* are simply referred to as "identification information 25**" when not distinguished from each other.

Here, the identification information 25 is information for identifying the beacon signal. The identification information 25 includes, for example, at least a UUID, Major, and Minor.

A universally unique identifier (UUID) is, for example, a 128-bit universally unique identifier. Each of the Major and Minor is, for example, a 16-bit identifier. Note that the identification information 25 may include a received signal strength indicator (RSSI) or the like.

The pieces of identification information 25_1 to **25_*n* have values different from each other. For example, the pieces of identification information 25_1 to 25_*n* are different from each other in at least one identifier of the UUID, Major, and Minor. In the present embodiment, as an example, the pieces of identification information 25_1 to 25_*n*** have different UUIDs, Majors, and Minors.

The communication apparatus 2 determines the beacon signal of the identification information 25 to be transmitted next based on status information 35 including values of statuses regarding reception or non-reception of the beacon signals, the status information 35 being received from the external apparatus. The specific configuration and operation of the communication apparatus 2 will be described below.

The information processing apparatus 3 is an apparatus performing predetermined processing with, as a trigger, switching of the status regarding reception or non-reception of the beacon signal transmitted from the communication apparatus 2. In the present embodiment, as an example, it is assumed the predetermined processing is processing of the information processing apparatus 3 transmitting and receiving data to and from the communication apparatus 2 and performing some kind of arithmetic operation (data processing) using the received data.

The information processing apparatus 3 is, for example, a program processing apparatus configured such that a processor such as a CPU, various storage devices such as a RAM, a ROM, and a flash memory, and peripheral circuits such as a counter (timer), a communication circuit, an A/D conversion circuit, a D/A conversion circuit, a clock generation circuit, and an input/output interface circuit are connected to each other via a bus or a dedicated line, the program processing apparatus being capable of wireless communication with an external apparatus. More specifically, the information processing apparatus 3 may be, for example, a stationary terminal such as a personal computer or a server or a mobile terminal such as a tablet or a smartphone.

The information processing apparatus 3 stores the status information 35 including the values of the statuses regarding reception or non-reception of the beacon signals.

FIG. 2 is a diagram illustrating an example of the status information 35.

The status information 35 is information including the value of the status regarding reception or non-reception of the beacon signal, the value being set for each of different beacon signals of the pieces of identification information 25_1 to **25_*n*. As illustrated in FIG. 2, the pieces of identification information 25_1 to 25_*n* of the beacon signals are stored in the status information 35 in association with the statuses regarding reception or non-reception of the beacon signals identified by the pieces of identification information 25_1 to 25_*n***. Here, a first value or a second value different from the first value is set as the status.

The first value is, for example, a value indicating reception by the information processing apparatus 3, in other words, the information processing apparatus 3 enters the beacon area of the beacon signal. The second value is, for example, a value indicating non-reception of the beacon signal by the information processing apparatus 3, in other words, the information processing apparatus 3 exits the beacon area of the beacon signal.

The status related to the beacon signal of the identification information 25 to be monitored by the information processing apparatus 3 is set in the status information 35. For example, FIG. 2 illustrates the status information 35 in a case of the beacon signals to be monitored by the information processing apparatus 3 being the beacon signals of the pieces of identification information 25_1 to **25_*n*. FIG. 2 also illustrates the status information 35 in a case of the status of the beacon signal of the identification information 25_1 (ID_A) being set to "reception (entry)" as the first value, the status of the beacon signal of the identification information 25_2 (ID_B) being set to "reception (entry)" as the first value, the status of the beacon signal of the identification information 25_3** (ID_C) being set to "non-reception (exit)" as the second value, and the status of the beacon signal of the identification information 25_n (ID_x) being set to "non-reception (exit)" as the second value. The information processing apparatus 3 monitors reception/non-reception of the beacon signal for each of the pieces of identification information 25 (beacon signals) to be monitored and updates the status information 35 by switching the value of the status according to the state of reception of the beacon signal of each of the pieces of identification information.

The information processing apparatus 3 transmits the status information 35 to the communication apparatus 2. The communication apparatus 2 switches the identification information of the beacon signal to be transmitted based on the status information 35 received from the information processing apparatus 3.

Hereinafter, specific configurations of the communication apparatus 2 and the information processing apparatus 3 will be described.

As illustrated in FIG. 1, the communication apparatus 2 includes a first communication unit 21, a second communication unit 22, a first control unit 23, and a first storage unit 24 as functional blocks. These functional blocks are achieved by, for example, cooperation between a program (software) and hardware of the program processing apparatus constituting the communication apparatus 2.

Specifically, the processor constituting the above-described communication apparatus 2 executes various calculations according to a program stored in the memory and controls the peripheral circuits such as the memory and the communication circuit in the communication apparatus 2, thereby achieving the first communication unit 21, the second communication unit 22, the first control unit 23, and the first storage unit 24.

The first communication unit 21 transmits a beacon signal including the identification information 25. The first communication unit 21 emits a beacon signal including the designated identification information 25 in conformity to the above-described communication standard according to an instruction from the first control unit 23.

The second communication unit 22 communicates with the external information processing apparatus 3. For example, the second communication unit 22 transmits and receives data by performing wireless communication with the information processing apparatus 3 by Bluetooth. Note that the communication standard of the wireless communication between the second communication unit 22 and the information processing apparatus 3 is not limited to Bluetooth and may be another communication standard such as Wi-Fi.

The second communication unit 22 receives the status information 35 including the values of the statuses regarding reception or non-reception of the beacon signals. The second communication unit 22 stores the received status information 35 in the first storage unit 24. The second communication unit 22 transmits designated data (action data 26) to the information processing apparatus 3 according to an instruction from the first control unit 23.

The first storage unit 24 stores data such as a parameter necessary for achieving a function as the communication apparatus 2. For example, the above-described pieces of identification information 25_1 to 25_n are stored in the first storage unit 24. Data (action data 26) to be transmitted to the information processing apparatus 3 is also stored in the first storage unit 24.

The first control unit 23 centrally controls each functional unit constituting the communication apparatus 2.

Specifically, the first control unit 23 selects one piece of identification information 25 from among the plurality of pieces of identification information 25_1 to 25_n and instructs the first communication unit 21 to transmit the beacon signal including the selected piece of identification information 25.

The first control unit 23 controls the first communication unit 21 to transmit the beacon signal while sequentially switching the identification information 25. Specifically, when the second communication unit 22 receives the status information 35 after the first communication unit 21 transmits the beacon signal, the first control unit 23 selects, based on the received status information 35, other identification information 25 different from the identification information 25 of the beacon signal transmitted most recently and instructs the first communication unit 21 to transmit the beacon signal including the selected identification information 25, instead of the beacon signal transmitted most recently.

For example, when the status corresponding to the identification information 25 included in the beacon signal transmitted most recently is set to the first value ("reception (entry)") and the status corresponding to the other identification information 25 is set to the second value ("non-reception (exit)") in the received status information 35, the first control unit 23 instructs the first communication unit 21 to transmit the beacon signal including the other identification information 25 having the status set to the second value, instead of the beacon signal transmitted most recently.

In addition, for example, when the status corresponding to the identification information 25 of the beacon signal transmitted most recently is set to the first value ("reception (entry)") and the status corresponding to the other identification information 25 is set to the first value ("reception (entry)") in the received status information 35, the first control unit 23 selects the identification information 25 of the beacon signal having a longest elapsed time from transmission stop and instructs the first communication unit 21 to transmit the beacon signal including the selected identification information 25.

When data communication is enabled between the second communication unit 22 and the information processing apparatus 3, the first control unit 23 instructs the second communication unit 22 to transmit, to the information processing apparatus 3, the action data 26 stored in the first storage unit 24.

Specifically, when the first communication unit 21 transmits the beacon signal and then the second communication unit 22 receives a response indicating reception of the beacon signal by the information processing apparatus 3, the first control unit 23 determines establishment of data communication connection between the second communication unit 22 and the information processing apparatus 3 and instructs the second communication unit 22 to transmit the action data 26 to the information processing apparatus 3.

As illustrated in FIG. 1, the information processing apparatus 3 includes a third communication unit 31, a fourth communication unit 32, a second control unit 33, and a second storage unit 34 as functional blocks. These functional blocks are achieved by, for example, cooperation between a program (software) and hardware of the program processing apparatus constituting the information processing apparatus 3. Specifically, the processor constituting the above-described information processing apparatus 3 executes various calculations according to a program stored in the memory and controls the peripheral circuits such as the memory and the communication circuit in the information processing apparatus 3, thereby achieving the third communication unit 31, the fourth communication unit 32, the second control unit 33, and the second storage unit 34.

The third communication unit 31 receives a beacon signal. For example, the third communication unit 31 receives a beacon signal transmitted from the communication apparatus 2, notifies the second control unit 33 of the reception of the beacon signal, and also gives the identification information included in the received beacon signal to the second control unit 33.

The fourth communication unit 32 communicates with the communication apparatus 2. For example, the fourth communication unit 32 transmits and receives data by performing wireless communication with the second communication unit 22 of the communication apparatus 2 by Bluetooth. Note that, as described above, the communication standard of the wireless communication between the fourth communication unit 32 and the communication apparatus 2 is not limited to Bluetooth and may be another communication standard such as Wi-Fi.

When receiving the action data 26 from the communication apparatus 2 through data communication with the communication apparatus 2, the fourth communication unit 32 stores the received action data 26 in the second storage unit 34 and also notifies the second control unit 33 of the reception of the action data 26.

The second storage unit 34 stores the status information 35 (see FIG. 2) including the value of the status regarding reception or non-reception of the beacon signal for each of the pieces of identification information 25_1 to 25_*n*. The status information 35 stored in the second storage unit 34 is updated by the second control unit 33.

The second control unit 33 centrally controls each functional unit constituting the information processing apparatus 3. Specifically, the second control unit 33 updates the status information 35 according to the states of reception of the beacon signals and also instructs the fourth communication unit 32 to transmit the status information 35.

For example, when the third communication unit 31 receives the beacon signal, the second control unit 33 updates, in the status information 35 stored in the second storage unit 34, the value of the status corresponding to the identification information 25 of the beacon signal received by the third communication unit 31 and also instructs the fourth communication unit 32 to transmit the updated status information 35 to the communication apparatus 2.

The status information 35 is updated in the following manner.

When the third communication unit 31 receives the beacon signal, the second control unit 33 sets the status corresponding to the identification information 25 of the received beacon signal to the first value ("reception (entry)").

On the other hand, when the third communication unit 31 does not receive the beacon signal, the second control unit 33 sets the status corresponding to the identification information 25 of the unreceived beacon signal to the second value ("non-reception (exit)").

For example, a case is considered. In the case, the beacon signal ID_A of the identification information 25_1 (ID_A) and the beacon signal ID_B of the identification information 25_2 (ID_B) are to be monitored. When receiving the beacon signal ID_A, the information processing apparatus 3 sets the status of the beacon signal ID_A to the first value ("reception (entry)") from the second value ("non-reception (exit)").

On the other hand, when the beacon signal ID_B is not received, in other words, when a period of not receiving the beacon signal ID_B exceeds a predetermined threshold value, the information processing apparatus 3 sets the status of the beacon signal ID_B to the second value ("non-reception (exit)") from the first value ("reception (entry)").

When the third communication unit 31 receives the beacon signal, the second control unit 33 instructs the fourth communication unit 32 to transmit, to the communication apparatus 2, a response indicating the reception of the beacon signal. The fourth communication unit 32 transmits the response indicating the reception of the beacon signal to the communication apparatus 2 according to the instruction from the second control unit 33, thereby establishing the above-described data communication connection (for example, Bluetooth connection) with the communication apparatus 2.

When the fourth communication unit 32 receives the action data 26 through the data communication with the communication apparatus 2, the second control unit 33 executes predetermined data processing using the action data 26.

Next, a communication flow between the communication apparatus 2 and the information processing apparatus 3 will be described.

Figure 3:
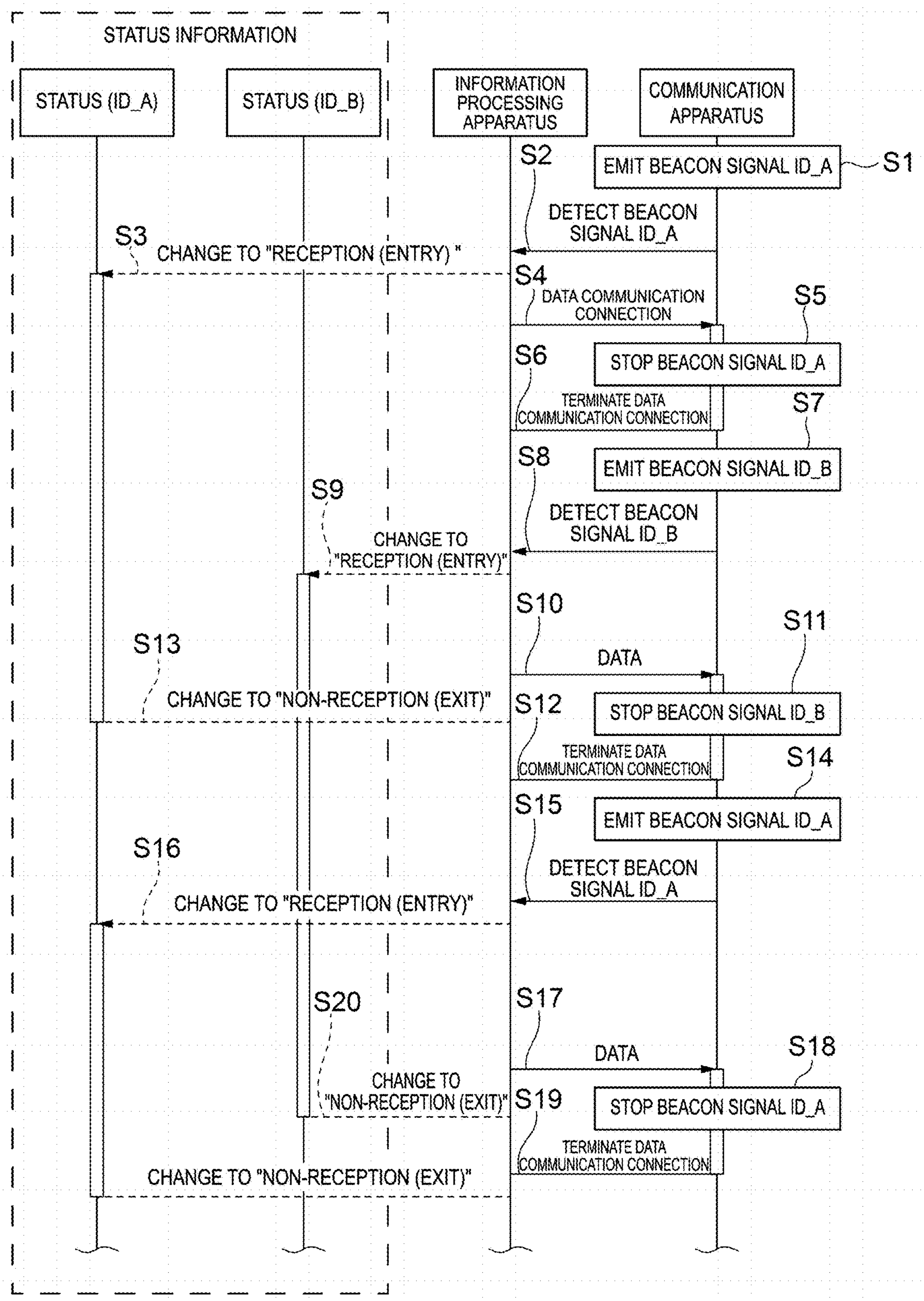
FIG. 3 is a sequence diagram illustrating an overview of communication between the communication apparatus and an information processing apparatus.

FIG. 3 is a sequence diagram illustrating an overview of the communication flow between the communication apparatus 2 and the information processing apparatus 3.

In FIG. 3, the two pieces of identification information ID_A and ID_B are assumed to be set as the identification information 25 to be monitored by the information processing apparatus 3, and the communication apparatus 2 is assumed to output the beacon signal ID_A including the identification information ID_A and the beacon signal ID_B including the identification information ID_B in a switching manner. Further, the initial values of the statuses of the identification information ID_A and the identification information ID_B included in the status information 35 are assumed to be the second value ("non-reception (exit)").

For example, the communication apparatus 2 first transmits the beacon signal ID_A including the identification information ID_A (step S1). Next, the information processing apparatus 3 detects (receives) the beacon signal ID_A transmitted in step S1 (step S2). The information processing apparatus 3 switches the status of the beacon signal ID_A received in step S2 from the second value ("non-reception (exit)") to the first value ("reception (entry)") (step S3), the status being included in the status information 35. At this time, in the status information 35, the status of the beacon signal ID_A is the first value ("reception (entry)"), and the status of the beacon signal ID_B is the second value ("non-reception (exit)").

Next, the information processing apparatus 3 transmits a response indicating the reception of the beacon signal ID_A and establishes data communication connection between the information processing apparatus 3 and the communication apparatus 2 (step S4). The information processing apparatus 3 transmits the status information 35 updated in the step S3 to the communication apparatus 2 through the data communication.

When receiving the response indicating the reception of the beacon signal ID_A from the information processing apparatus 3, the communication apparatus 2 stops transmitting the beacon signal ID_A (step S5). Moreover, when receiving the status information 35, the communication apparatus 2 transmits, to the information processing apparatus 3, a response indicating the reception of the status information 35. When receiving the response indicating the reception of the status information 35, the information processing apparatus 3 terminates the data communication connection with the communication apparatus 2 (step S6).

Next, the communication apparatus 2 determines the identification information 25 to be transmitted next with reference to the status information 35 received through the data communication with the information processing apparatus 3 and emits (transmits) a beacon signal including the determined identification information 25 (step S7). In the case of the above-described example, in the status information 35 received by the communication apparatus 2, the status of the beacon signal ID_A is the first value ("reception (entry)"), and the status of the beacon signal ID_B is the second value ("non-reception (exit)"). Thus, the communication apparatus 2 transmits the beacon signal ID_B including the identification information ID_B having the status of the second value ("non-reception (exit)").

Next, the information processing apparatus 3 detects (receives) the beacon signal ID_B transmitted in step S7 (step S8). The information processing apparatus 3 switches the status of the beacon signal ID_B received in step S8 from the second value ("non-reception (exit)") to the first value ("reception (entry)"), the status being included in the status information 35 (step S9). At this time, in the status information 35, the status of the beacon signal ID_A is the first value ("reception (entry)"), and the status of the beacon signal ID_B is the first value ("reception (entry)").

Next, the information processing apparatus 3 transmits a response indicating the reception of the beacon signal ID_B and establishes data communication connection between the information processing apparatus 3 and the communication apparatus 2. The information processing apparatus 3 transmits, through the data communication, the status information 35 updated in step S9 to the communication apparatus 2 (step S10).

When receiving, from the information processing apparatus 3, the response indicating the reception of the beacon signal ID_B, the communication apparatus 2 stops transmitting the beacon signal ID_B (step S11). Moreover, when receiving the status information 35, the communication apparatus 2 transmits, to the information processing apparatus 3, a response indicating the reception of the status information 35. When receiving the response indicating the reception of the status information 35, the information processing apparatus 3 terminates the data communication connection with the communication apparatus 2 (step S12).

On the other hand, when a period of not receiving the beacon signal ID_A reaches a predetermined period set in advance in the information processing apparatus 3, the information processing apparatus 3 switches the status of the beacon signal ID_A from the first value ("reception (entry)") to the second value ("non-reception (exit)"), the status being included in the status information 35 (step S13). At this time, in the status information 35, the status of the beacon signal ID_A is the second value ("non-reception (exit)"), and the status of the beacon signal ID_B is the first value ("reception (entry)").

Next, the communication apparatus 2 determines the identification information 25 to be transmitted next with reference to the status information 35 received in step S10 and transmits a beacon signal including the determined identification information 25 (step S14). In the case of the above-described example, in the received status information 35, the status of the beacon signal ID_A is "reception (entry)", and the status of the beacon signal ID_B is "reception (entry)". Then, the communication apparatus 2 selects the identification information 25 of the beacon signal having a longest elapsed time from transmission stop and transmits the beacon signal including the selected identification information 25. In the case of the above-described example, when the beacon signal ID_A and the beacon signal ID_B are compared, the elapsed time of the beacon signal ID_A from transmission stop is longer. Thus, in step S15, the communication apparatus 2 transmits the beacon signal ID_A.

Next, the information processing apparatus 3 detects (receives) the beacon signal ID_A transmitted in step S14 (step S15). The information processing apparatus 3 switches the status of the beacon signal ID_A received in step S15 from the second value ("non-reception (exit)") to the first value ("reception (entry)"), the status being included in the status information 35 (step S16). At this time, in the status information 35, the status of the beacon signal ID_A is the first value ("reception (entry)"), and the status of the beacon signal ID_B is the first value ("reception (entry)").

Next, the information processing apparatus 3 transmits a response indicating the reception of the beacon signal ID_A and establishes data communication connection between the information processing apparatus 3 and the communication apparatus 2 (step S17). The information processing apparatus 3 transmits, through the data communication, the status information 35 updated in step S16 to the communication apparatus 2.

When receiving, from the information processing apparatus 3, the response indicating the reception of the beacon signal ID_A, the communication apparatus 2 stops transmitting the beacon signal ID_A (step S18). Moreover, when receiving the status information 35, the communication apparatus 2 transmits, to the information processing apparatus 3, a response indicating the reception of the status information 35. When receiving the response indicating the reception of the status information 35, the information processing apparatus 3 terminates the data communication connection with the communication apparatus 2 (step S19).

On the other hand, when a period of not receiving the beacon signal ID_B reaches the predetermined period set in advance in the information processing apparatus 3, the information processing apparatus 3 switches the status of the beacon signal ID_B from "reception (entry)" to "non-reception (exit)", the status being included in the status information 35 (step S20).

Through the above-described procedure, the communication apparatus 2 receives the status information 35 managed by the information processing apparatus 3 and repeatedly emits the beacon signal while switching the identification information 25 based on the status information 35, so that the information processing apparatus 3 can repeatedly execute the processing with the reception of the beacon signal as a trigger.

Next, a detailed procedure of the communication apparatus 2 will be described.

Figure 4:
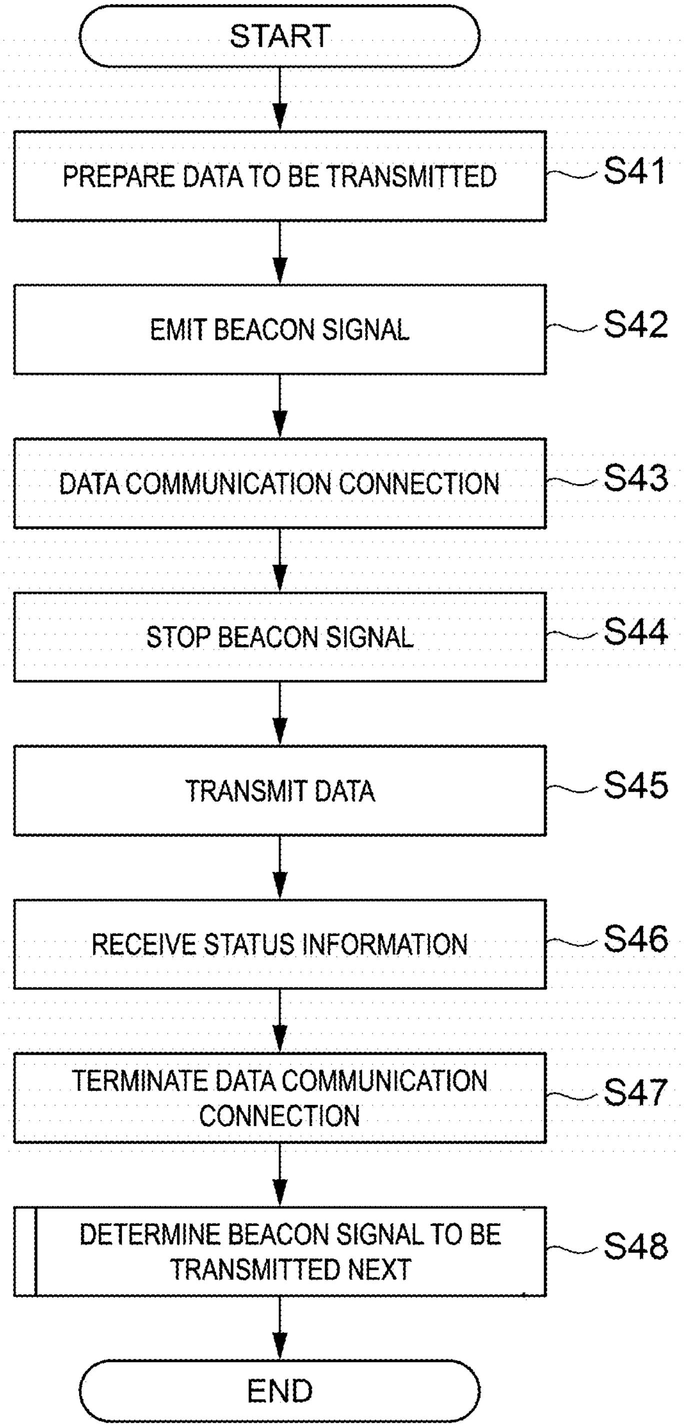
FIG. 4 is a flowchart illustrating a detailed procedure of the communication apparatus.

FIG. 4 is a flowchart illustrating the detailed procedure of the communication apparatus 2.

When it becomes necessary to transmit the action data 26 according to an instruction from a timer or an external apparatus, the communication apparatus 2 prepares the action data 26 to be transmitted (step S41). For example, the first control unit 23 reads, from the first storage unit 24, the action data 26 to be transmitted.

Next, the communication apparatus 2 emits a beacon signal (step S42). Specifically, as described above, the first control unit 23 selects one piece of identification information 25 from among the plurality of pieces of identification information 25_1 to **25_*n* stored in the first storage unit 24 and instructs the first communication unit 21 to transmit a beacon signal including the selected piece of identification information 25, so that the first communication unit 21** emits the beacon signal.

Next, data communication connection is established between the communication apparatus 2 and the information processing apparatus 3 receiving the beacon signal transmitted in step S42 (step S43). For example, when a response indicating the reception of the beacon signal is transmitted from the information processing apparatus 3 and the communication apparatus 2 receives the response, the data communication connection is established between the second communication unit 22 of the communication apparatus 2 and the fourth communication unit 32 of the information processing apparatus 3.

Next, the communication apparatus 2 stops the emission (transmission) of the beacon signal started in step S42 (step S44). Specifically, the first control unit 23 instructs the first communication unit 21 to stop transmitting the beacon signal, so that the first communication unit 21 stops transmitting the beacon signal.

Next, the communication apparatus 2 transmits the action data 26 prepared in step S41 to the information processing apparatus 3 (step S45). Specifically, the first control unit 23 instructs the second communication unit 22 to transmit the action data 26 read from the first storage unit 24 in step S41, so that the second communication unit 22 transmits the action data 26 to the information processing apparatus 3.

Next, the communication apparatus 2 receives the status information 35 from the information processing apparatus 3 (step S46). Specifically, the second communication unit 22 receives the status information 35 transmitted from the fourth communication unit 32 of the information processing apparatus 3 through the data communication connection established in step S43 and stores the received status information 35 in the first storage unit 24.

Next, the data communication connection between the communication apparatus 2 and the information processing apparatus 3 is terminated (step S47). For example, when the second communication unit 22 transmits, to the information processing apparatus 3, a response indicating the reception of the status information 35 and the information processing apparatus 3 receives the response, the information processing apparatus 3 terminates the data communication connection.

Next, the communication apparatus 2 determines a beacon signal (identification information) to be transmitted next (step S48).

Figure 5:
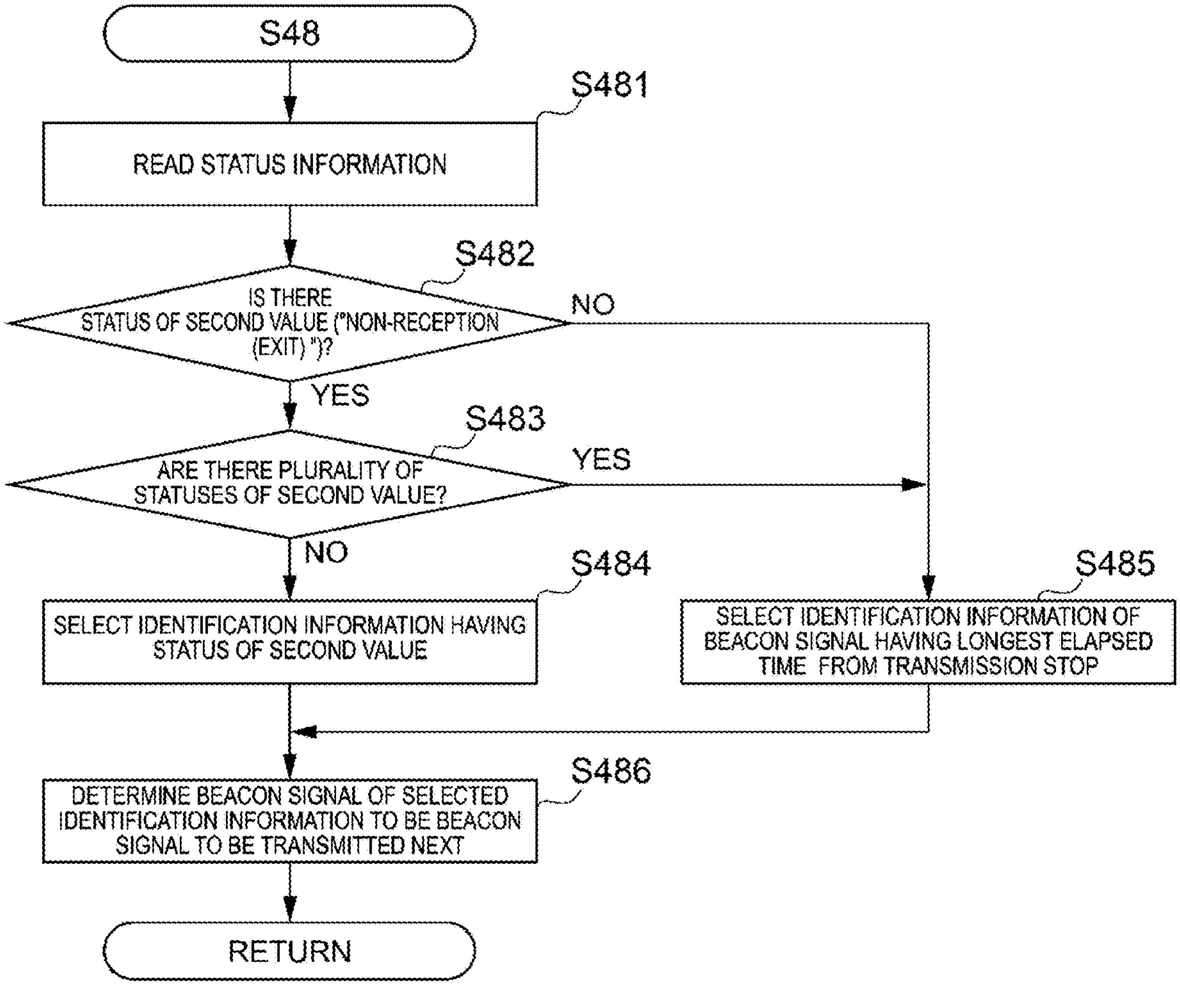
FIG. 5 is a flowchart illustrating an example of a method of determining a beacon signal (identification information) to be transmitted next by the communication apparatus.

FIG. 5 is a flowchart illustrating an example of a method of determining the beacon signal (identification information) to be transmitted next by the communication apparatus 2.

In step S48 of FIG. 4, the first control unit 23 of the communication apparatus 2 first reads, from the first storage unit 24, the status information 35 received in step S46 (step S481). The first control unit 23 determines whether there is identification information 25 having the status set to the second value ("non-reception (exit)") in the read status information 35 (step S482).

When there is identification information 25 having the status set to the second value ("non-reception (exit)") (YES in step S482), the first control unit 23 determines whether there are a plurality of pieces of identification information 25 having the statuses set to the second value (step S483).

When there is only one piece of identification information 25 having the status set to the second value ("non-reception (exit)") (NO in step S483), the first control unit 23 selects the identification information 25 having the status set to the second value ("non-reception (exit)") from the first storage unit 24 (step S484). Then, the first control unit 23 determines the beacon signal of the identification information 25 selected in step S484 to be the beacon signal to be transmitted next (step S486). This is the end of the processing of step S48.

On the other hand, when there is no identification information 25 having the status set to the second value ("non-reception (exit)") (NO in step S482) or when there are a plurality of pieces of identification information 25 having the statuses set to the second value ("non-reception (exit)") (YES in step S483), the first control unit 23 selects the identification information 25 of the beacon signal having a longest elapsed time from transmission stop (step S485).

For example, in an assumed case, the three pieces of identification information ID_A, ID_B, and ID_C are present, the beacon signal ID_A of the identification information ID_A is transmitted first, the beacon signal ID_B of the identification information ID_B is transmitted next, the beacon signal ID_C of the identification information ID_C is transmitted next, and all the statuses of the beacon signals ID_A, ID_B, and ID_C are the first value ("reception (entry)").

In this case, among the three beacon signals ID_A, ID_B, and ID_C, the first control unit 23 selects, as a beacon signal to be transmitted next to the beacon signal ID_C, the beacon signal (identification information) ID_A having a longest elapsed time from last transmission stop.

Then, the first control unit 23 determines the beacon signal of the identification information 25 selected in step S485 to be the beacon signal to be transmitted next (step S486). This is the end of the processing of step S48.

Next, a detailed procedure of the information processing apparatus 3 will be described.

Figure 6:
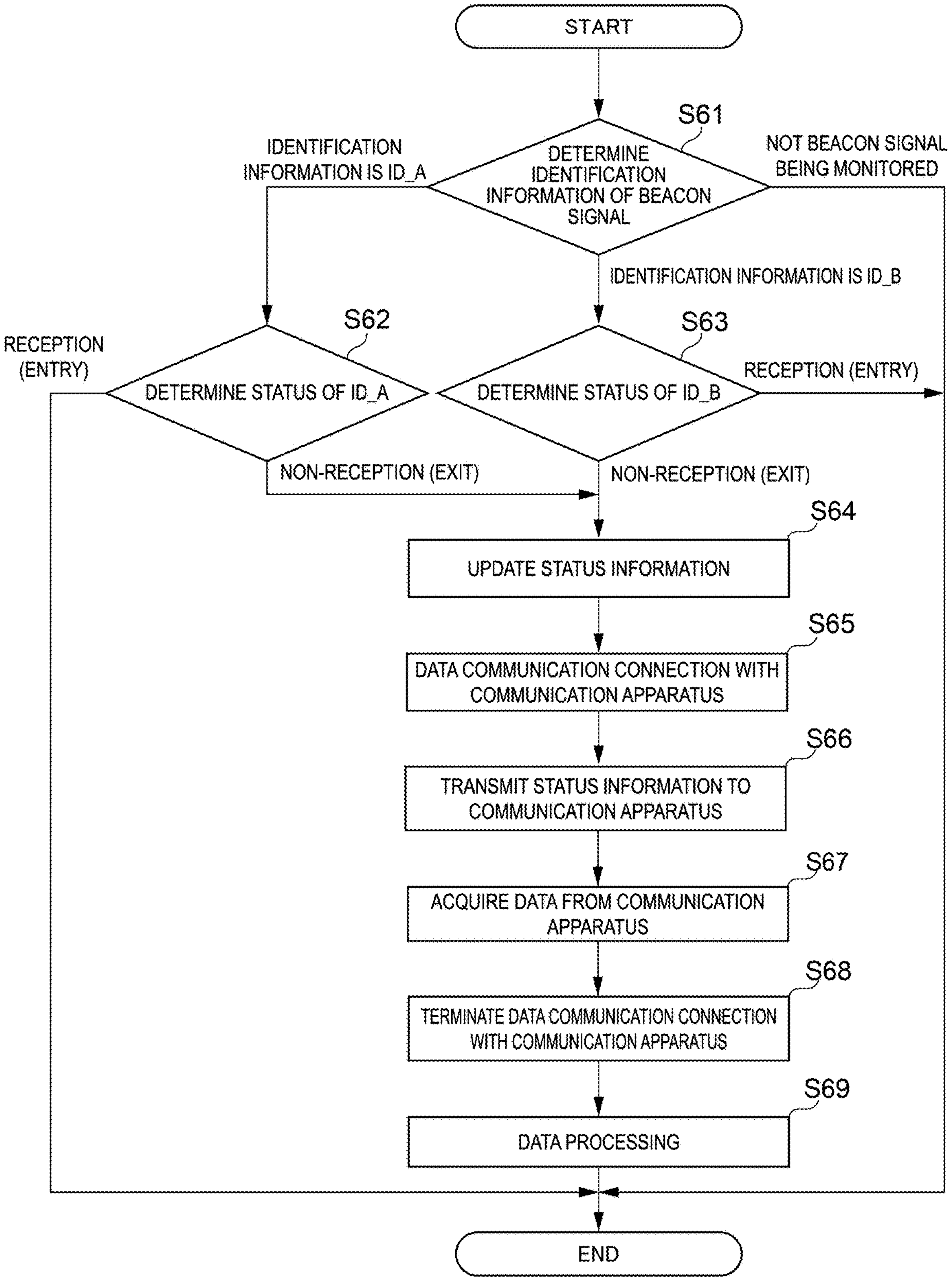
FIG. 6 is a flowchart illustrating a detailed procedure of the information processing apparatus.

FIG. 6 is a flowchart illustrating the detailed procedure of the information processing apparatus 3.

Here, as an example, the beacon signal ID_A of the identification information 25_1 (ID_A) and the beacon signal ID_B of the identification information 25_2 (ID_B) are assumed to be beacon signals to be monitored by the information processing apparatus 3.

For example, the information processing apparatus 3 enters a beacon signal waiting state after activation. When a beacon signal to be monitored is not received for a certain period of time in the waiting state, the second control unit 33 sets, among the statuses included in the status information 35 stored in the second storage unit 34, the status corresponding to the identification information 25 of the unreceived beacon signal to the second value ("non-reception (exit)").

When receiving the beacon signal in the waiting state, the information processing apparatus 3 starts predetermined processing. In the predetermined processing, the information processing apparatus 3 first determines the identification information 25 of the received beacon signal (step S61). Specifically, when the third communication unit 31 receives the beacon signal, the second control unit 33 determines whether or not the received beacon signal is the beacon signal to be monitored with reference to the identification information included in the received beacon signal.

When the identification information of the beacon signal received in step S61 does not match any identification information to be monitored, the information processing apparatus 3 ends the predetermined processing and transitions to the beacon signal waiting state again.

When the received beacon signal is the beacon signal of the identification information 25 to be monitored and is the beacon signal ID_A in step S61, the information processing apparatus 3 determines the status of the beacon signal ID_A (step S62). Specifically, the second control unit 33 determines the value of the status of the beacon signal ID_A with reference to the status information 35 stored in the second storage unit 34.

In step S62, when the status of the beacon signal ID_A included in the status information 35 is the first value ("reception (entry)"), the second control unit 33 ends the predetermined processing without updating the status information 35 and transitions to the beacon signal waiting state.

In step S62, when the status of the beacon signal ID_A included in the status information 35 is the second value ("non-reception (exit)"), the second control unit 33 updates the status information 35 stored in the second storage unit 34 by changing the status of the beacon signal ID_A from the second value ("non-reception (exit)") to the first value ("reception (entry)") (step S64).

When the received beacon signal is the beacon signal of the identification information 25 to be monitored and is the beacon signal ID_B in step S61, the information processing apparatus 3 determines the status of the beacon signal ID_B (step S63). Specifically, the second control unit 33 determines the value of the status of the beacon signal ID_B with reference to the status information 35 stored in the second storage unit 34.

In step S63, when the status of the beacon signal ID_B included in the status information 35 is the first value ("reception (entry)"), the second control unit 33 ends the predetermined processing without updating the status information 35 and transitions to the beacon signal waiting state.

In step S63, when the status of the beacon signal ID_B included in the status information 35 is the second value ("non-reception (exit)"), the second control unit 33 updates the status information 35 stored in the second storage unit 34 by changing the status of the beacon signal ID_B from the second value ("non-reception (exit)") to the first value ("reception (entry)") (step S64).

After the status information 35 is updated in step S64, the information processing apparatus 3 establishes data communication connection with the communication apparatus 2 (step S65). Specifically, the second control unit 33 instructs the fourth communication unit 32 to transmit a response indicating the reception of the beacon signal, and the fourth communication unit 32 transmits the response to the communication apparatus 2, thereby establishing the data communication connection with the communication apparatus 2.

Next, the information processing apparatus 3 transmits the status information 35 to the communication apparatus 2 having the established data communication connection (step S66). Specifically, the second control unit 33 reads the status information 35 from the second storage unit 34 and instructs the fourth communication unit 32 to transmit the read status information 35, and the fourth communication unit 32 transmits the status information 35 to the communication apparatus 2.

Next, the information processing apparatus 3 receives the action data 26 transmitted from the communication apparatus 2 (step S67). Specifically, the fourth communication unit 32 receives the action data 26 transmitted from the communication apparatus 2 and stores the action data 26 in the second storage unit 34 and also notifies the second control unit 33 of the reception of the action data 26.

Next, the information processing apparatus 3 terminates the data communication connection with the communication apparatus 2 (step S68). Specifically, when a response indicating reception of the status information 35 by the communication apparatus 2 is transmitted from the communication apparatus 2 and the response is received by the fourth communication unit 32, the second control unit 33 terminates the data communication connection between the information processing apparatus 3 and the communication apparatus 2.

Thereafter, the information processing apparatus 3 executes data processing using the action data 26 received in step S67 (step S69).

As described above, in the information processing system 1 according to the embodiment, when receiving the beacon signal, the information processing apparatus 3 at the reception end of the beacon signal updates the status information 35 by changing the value of the status associated with the identification information 25 of the received beacon signal and transmits the status information 35 to the communication apparatus 2 at the emission end of the beacon signal. When receiving the status information 35 after transmitting the beacon signal, the communication apparatus 2 selects, based on the status information 35, the other identification information 25 different from the identification information 25 included in the beacon signal transmitted most recently and transmits the beacon signal including the selected identification information 25, instead of the beacon signal transmitted most recently.

Accordingly, the communication apparatus 2 checks the reception state of the beacon signal in the information processing apparatus 3 and then transmits, instead of the beacon signal transmitted most recently, the beacon signal including the other identification information 25 different from the identification information 25 included in the beacon signal transmitted most recently. Thus, even if the status of the beacon signal transmitted most recently is "reception (entry)", the status of the other beacon signal can be newly transitioned from "non-reception (exit)" to "reception (entry)". Further, since the emission of the beacon signal transmitted most recently is stopped, the status of the beacon signal transmitted most recently can be transitioned from "reception (entry)" to "non-reception (exit)" after the status of the other beacon signal is transitioned from "non-reception (exit)" to "reception (entry)".

In this way, according to the information processing system 1, it is possible to repeatedly switch the status the number of times corresponding to the types of the beacon signals (identification information 25) in the information processing apparatus 3. This makes it possible to repeatedly prompt the information processing apparatus 3 to execute processing (generate an event) with, as a trigger, the switching of the status regarding reception or non-reception of the beacon signal without moving the information processing apparatus 3 to the outside of the beacon area.

Specifically, as described above, when receiving the beacon signal, the information processing apparatus 3 sets the status corresponding to the identification information 25 of the received beacon signal to the first value ("reception (entry)"), and when not receiving the beacon signal, the information processing apparatus 3 sets the status corresponding to the identification information 25 of the unreceived beacon signal to the second value ("non-reception (exit)"). On the other hand, as described above, the communication apparatus 2 selects, from among the plurality of pieces of identification information 25_1 to **25_*n*, the identification information 25 having the status set to the second value in the received status information 35 and transmits the beacon signal including the selected identification information 25**, instead of the beacon signal transmitted most recently.

Accordingly, since the communication apparatus 2 preferentially transmits the beacon signal having the status of "non-reception (exit)" in the information processing apparatus 3, it is possible to more reliably cause the information processing apparatus 3 to switch the status regarding reception or non-reception of the beacon signal.

Moreover, as described above, when the status corresponding to the identification information 25 of the beacon signal transmitted most recently is set to the first value ("reception (entry)") and the status corresponding to the other identification information 25 is set to the first value ("reception (entry)") in the status information 35, the communication apparatus 2 selects the identification information 25 of the beacon signal having a longest elapsed time from transmission stop and transmits the beacon signal including the selected identification information 25, instead of the beacon signal transmitted most recently.

Accordingly, even in a situation of there being no beacon signal (identification information 25) having the status of "non-reception (exit)" in the information processing apparatus 3 when the status information 35 is transmitted, the communication apparatus 2 preferentially transmits the beacon signal of the identification information having the status most likely to become "non-reception (exit)" later. This makes it possible to increase the probability of switching the status regarding reception or non-reception of the beacon signal in the information processing apparatus 3.

Expansion of Embodiments

The invention made by the present inventors has been specifically described above based on the embodiments, but the present invention is not limited to the embodiments, and it goes without saying that the present invention can be changed in various ways within the scope not departing from the gist of the present invention.

In the above-described embodiments, a case has been described as an example. In the case, when all the statuses included in the status information 35 are set to the first value ("reception (entry)"), the communication apparatus 2 selects the identification information 25 of the beacon signal having a longest elapsed time from transmission stop and transmits the beacon signal of the selected identification information 25, instead of the beacon signal transmitted most recently. However, no such a limitation is intended.

For example, in a case of all the statuses included in the status information 35 being set to the first value ("reception (entry)") when the information processing apparatus 3 transmits the status information 35, the second control unit 33 generates new identification information 25 and also sets the status corresponding to the new identification information 25 to the second value ("non-reception (exit)"). Then, the second control unit 33 may generate new status information 35 by adding the new identification information 25 and the value of the status corresponding to the new identification information 25 and instruct the fourth communication unit 32 to transmit the new status information 35.

On the other hand, in the communication apparatus 2, when the status information 35 received by the second communication unit 22 includes the new identification information 25 not stored in the first storage unit 24 and the value of the status corresponding to the new identification information 25, the first control unit 23 may store the new identification information 25 in the first storage unit 24.

For example, a case is considered. In the case, beacon signals to be monitored by the information processing apparatus 3 are the beacon signals ID_A, ID_B, and ID_C corresponding to the three types of identification information ID_A, ID_B, and ID_C, and the statuses of the beacon signals ID_A, ID_B, and ID_C included in the status information 35 are each set to the first value ("reception (entry)") when the status information 35 is transmitted.

In this case, in the information processing apparatus 3, the second control unit 33 newly generates identification information ID_D, sets the status of the identification information ID_D to the second value ("non-reception (exit)"), generates new status information 35 by adding the status (second value) of the identification information ID_D to the existing status information 35, and instructs the fourth communication unit 32 to transmit the new status information 35 to the communication apparatus 2.

On the other hand, in the communication apparatus 2, the first control unit 23 adds the new identification information ID_D included in the status information 35 to the first storage unit 24 with reference to the received new status information 35, and instructs the first communication unit 21 to transmit the beacon signal of the identification information ID_D having the status set to the second value ("non-reception (exit)"), instead of the beacon signal transmitted most recently.

Accordingly, even in a situation of there being no beacon signal (identification information 25) having the status of the second value ("non-reception (exit)") in the information processing apparatus 3, the communication apparatus 2 can emit the beacon signal of the new identification information 25. Thus, it is possible to more reliably cause the information processing apparatus 3 to switch the status regarding reception or non-reception of the beacon signal.

Furthermore, the flowcharts described above are examples, and the embodiments are not limited to these examples. For example, other processing operations may be inserted between the steps, or the processing operations may be performed in parallel.

REFERENCE SIGNS LIST

1 Information processing system, 2 Communication apparatus, 3 Information processing apparatus, 21 First communication unit, 22 Second communication unit, 24 First storage unit, 25, 25_1 to **25_*n* Identification information, 26 Action data, 31 Third communication unit, 32 Fourth communication unit, 33 Second control unit, 34 Second storage unit, 35** Status information

The invention claimed is:

1. A communication apparatus comprising:

a first communication unit configured to transmit a beacon signal including identification information;

a second communication unit configured to communicate with an external information processing apparatus;

a first storage unit configured to store a plurality of pieces of the identification information different from each other; and a first control unit configured to select one piece of identification information from among the plurality of pieces of identification information and instruct the first communication unit to transmit the beacon signal including the selected piece of identification information, wherein the second communication unit receives status information including a value of a status regarding reception or non-reception of the beacon signal, the status is associated with each of the pieces of identification information, and when the second communication unit receives the status information after the first communication unit transmits the beacon signal, the first control unit selects, based on the status information, another identification information different from the identification information of the beacon signal transmitted most recently and instructs the first communication unit to transmit the beacon signal including the selected identification information, instead of the beacon signal transmitted most recently.

2. The communication apparatus according to claim 1, wherein a first value or a second value different from the first value is set as the value of the status, and when the status corresponding to the identification information included in the beacon signal transmitted most recently is set to the first value and the status corresponding to the other identification information is set to the second value in the received status information, the first control unit instructs the first communication unit to transmit the beacon signal including the other identification information having the status set to the second value, instead of the beacon signal transmitted most recently.

3. The communication apparatus according to claim 2, wherein when the status corresponding to the identification information of the beacon signal transmitted most recently is set to the first value and the status corresponding to the other identification information is set to the first value in the received status information, the first control unit selects the identification information of the beacon signal having a longest elapsed time from transmission stop and instructs the first communication unit to transmit the beacon signal including the selected identification information, instead of the beacon signal transmitted most recently.

4. The communication apparatus according to claim 2, wherein when the received status information includes new identification information not stored in the first storage unit and the value of the status corresponding to the new identification information, the first control unit stores the new identification information in the first storage unit.

5. The communication apparatus according to claim 1, wherein when the first communication unit transmits the beacon signal and then the second communication unit receives a response indicating reception of the beacon signal by the information processing apparatus, the first control unit instructs the second communication unit to transmit data to the information processing apparatus.

6. An information processing system comprising:

a communication apparatus; and an information processing apparatus, wherein the communication apparatus includes a first communication unit configured to transmit a beacon signal including identification information, a second communication unit configured to communicate with the information processing apparatus, a first storage unit configured to store a plurality of pieces of the identification information different from each other, and a first control unit configured to select one piece of identification information from among the plurality of pieces of identification information and instruct the first communication unit to transmit the beacon signal including the selected piece of identification information, the information processing apparatus includes a third communication unit configured to receive the beacon signal, a fourth communication unit configured to communicate with the communication apparatus, a second storage unit configured to store, for each of the pieces of identification information, status information including a value of a status regarding reception or non-reception of the beacon signal of each of the pieces of identification information, and a second control unit configured to update the status information upon reception of the beacon signal and instruct the fourth communication unit to transmit the status information, the status is associated with each of the pieces of identification information, in the communication apparatus, the first communication unit transmits the beacon signal, in the information processing apparatus, when the third communication unit receives the beacon signal, the second control unit updates, in the status information stored in the second storage unit, the value of the status corresponding to the identification information of the beacon signal received by the third communication unit and instructs the fourth communication unit to transmit the updated status information to the communication apparatus, and in the communication apparatus, when the second communication unit receives the status information after the first communication unit transmits the beacon signal, the first control unit selects, based on the status information, another identification information different from the identification information included in the beacon signal transmitted most recently and instructs the first communication unit to transmit the beacon signal including the selected identification information, instead of the beacon signal transmitted most recently.

7. The information processing system according to claim 6, wherein in the information processing apparatus, when the third communication unit receives the beacon signal, the second control unit sets the status corresponding to the identification information of the received beacon signal to a first value, and sets the status corresponding to the identification information of the unreceived beacon signal to a second value when the third communication unit does not receive the beacon signal, and in the communication apparatus, the first control unit selects, from among the plurality of pieces of identification information, the identification information having the status set to the second value in the received status information and instructs the first communication unit to transmit the beacon signal including the selected identification information, instead of the beacon signal transmitted most recently.

8. The information processing system according to claim 7, wherein when the status corresponding to the identification information of the beacon signal transmitted most recently is set to the first value and the status corresponding to the other identification information is set to the first value in the received status information, the first control unit selects the identification information of the beacon signal having a longest elapsed time from transmission stop and instructs the first communication unit to transmit the beacon signal including the selected identification information, instead of the beacon signal transmitted most recently.

9. The information processing system according to claim 7, wherein in the information processing apparatus, if all the statuses included in the status information are set to the first value when the status information is transmitted, the second control unit generates new identification information, sets the status corresponding to the new identification information to the second value, generates new status information by adding the new identification information and the value of the status corresponding to the new identification information, and instructs the fourth communication unit to transmit the new status information, and in the communication apparatus, when the status information received by the second communication unit includes the new identification information not stored in the first storage unit and the value of the status corresponding to the new identification information, the first control unit stores the new identification information in the first storage unit.

10. The information processing system according to claim 6, wherein in the information processing apparatus, when the third communication unit receives the beacon signal, the second control unit transmits, to the communication apparatus, a response indicating reception of the beacon signal, and in the communication apparatus, when the second communication unit receives the response, the first control unit instructs the second communication unit to transmit data to the information processing apparatus.

11. An information processing method by an information processing system including a communication apparatus configured to store a plurality of pieces of identification information different from each other and transmit a beacon signal including one piece of identification information selected from among the plurality of pieces of identification information, and an information processing apparatus configured to store status information including a value of a status regarding reception or non-reception of the beacon signal, the status being associated with each of the pieces of identification information, the information processing method comprising:

a first step of transmitting, by the communication apparatus, the beacon signal;

a second step of receiving, by the information processing apparatus, the beacon signal;

a third step of updating, by the information processing apparatus, the value of the status corresponding to the identification information of the beacon signal received in the second step, the value being included in the status information;

a fourth step of transmitting, by the information processing apparatus, the status information updated in the third step to the communication apparatus; and a fifth step of, when the status information is received, selecting, by the communication apparatus, another identification information different from the identification information included in the beacon signal transmitted most recently based on the status information and transmitting, by the communication apparatus, the beacon signal including the selected identification information, instead of the beacon signal transmitted most recently.

12. The information processing method according to claim 11, wherein the third step includes a sixth step of setting, by the information processing apparatus, the status corresponding to the identification information of the received beacon signal to a first value when the beacon signal is received, and a seventh step of setting, by the information processing apparatus, the status corresponding to the identification information of the unreceived beacon signal to a second value when the beacon signal is not received, and the fifth step includes an eighth step of selecting, by the communication apparatus, the identification information having the status set to the second value in the received status information from among the plurality of pieces of identification information, and a ninth step of transmitting, by the communication apparatus, the beacon signal including the identification information selected in the eighth step, instead of the beacon signal transmitted most recently.

* * * * *